(12) United States Patent
Bingham, Jr. et al.

(10) Patent No.: US 9,130,362 B2
(45) Date of Patent: Sep. 8, 2015

(54) CONNECTOR MEMBER INCLUDING A LOCKING ELEMENT

(71) Applicant: REMY TECHNOLOGIES, L.L.C., Pendleton, IN (US)

(72) Inventors: Billy Forest Bingham, Jr., Anderson, IN (US); Steven C. Burton, Anderson, IN (US)

(73) Assignee: REMY TECHNOLOGIES, L.L.C., Pendleton, IN (US)

( * ) Notice: Subject to any disclaimer, the term of this patent is extended or adjusted under 35 U.S.C. 154(b) by 176 days.

(21) Appl. No.: 13/722,126

(22) Filed: Dec. 20, 2012

(65) Prior Publication Data

US 2014/0174818 A1   Jun. 26, 2014

(51) Int. Cl.
*H02G 3/22* (2006.01)

(52) U.S. Cl.
CPC .............. *H02G 3/22* (2013.01); *Y10T 29/49826* (2015.01)

(58) Field of Classification Search
CPC ............................... H02G 3/22; Y10T 29/4986
See application file for complete search history.

(56) References Cited

U.S. PATENT DOCUMENTS

| | | | |
|---|---|---|---|
| 1,841,318 A * | 1/1932 | Earnest | 464/173 |
| 4,627,647 A * | 12/1986 | Hauff | 285/189 |
| 4,900,901 A * | 2/1990 | Richard | 235/95 R |
| 4,903,942 A | 2/1990 | Licciardello et al. | |
| 5,263,746 A * | 11/1993 | Cornwall | 285/136.1 |
| 5,397,196 A | 3/1995 | Boiret et al. | |
| 6,152,753 A | 11/2000 | Johnson et al. | |
| 7,918,486 B2 | 4/2011 | Preisendorfer | |
| 2005/0077725 A1 | 4/2005 | Bartholoma et al. | |
| 2007/0120362 A1* | 5/2007 | Poder | 285/314 |
| 2009/0130887 A1 | 5/2009 | Guilbert et al. | |
| 2012/0298063 A1 | 11/2012 | Schieszl | |

OTHER PUBLICATIONS

International Search Report and Written Opinion for PCT Application No. PCT/US2013/075257, dated Mar. 18, 2014, pp. 1-14.

* cited by examiner

*Primary Examiner* — Timothy Thompson
*Assistant Examiner* — Krystal Robinson
(74) *Attorney, Agent, or Firm* — Cantor Colburn LLP

(57) ABSTRACT

A connector member includes a coupler portion having a wall including a first end that extends to a second end that defines a connection zone. The wall includes an outer surface. A mounting portion is provided at the first end. The mounting portion includes one or more cantilevered beam elements that extend along the wall spaced from the outer surface. A locking member extends about the coupler portion between the one or more cantilevered beam elements and the outer surface of the wall. The locking member is configured and disposed to limit deflection of the one or more cantilevered beam elements to prevent removal of the connector member from a substrate.

15 Claims, 7 Drawing Sheets

CONNECTOR MEMBER INCLUDING A LOCKING ELEMENT

BACKGROUND OF THE INVENTION

Exemplary embodiments pertain to the art of connectors and, more particularly, to a connector member having a locking element.

Many systems include connectors in one form or another. The connectors provide an interface between the system and an associated system. The connectors provide an attachment point for a cable, a conduit or the like. For example, computers include a variety of connectors that are configured to receive cables that provide an interface with various peripheral devices such as a keyboard, a mouse, a monitor and the like. Other systems, such as motor vehicle engines, include a variety of connectors that receive various interface cables. The cables provide communication links between engine systems and motor vehicle controllers, monitors, sensors, and the like.

In some cases, connectors are mounted to a housing using various types of mechanical fasteners such as screws, bolts, and nuts. In other cases, the connector will include a threaded end that engages with a threaded fastener. More specifically, the connector is installed through one surface of the housing and the threaded fastener is installed and tightened against another, opposing surface of the housing. In still other cases, connectors are mounted to a housing through built-in resilient connectors such as cantilevered beam snap features. Cantilevered beam snap features generally include a streamlined snap member that facilitates insertion of the connector into an opening. Once seated, the cantilevered beam snap pivots and the snap feature engages with the housing to prevent removal.

BRIEF DESCRIPTION OF THE INVENTION

Disclosed is a connector member including a coupler portion having a wall including a first end that extends to a second end that defines a connection zone. The wall includes an outer surface. A mounting portion is provided at the first end. The mounting portion includes one or more cantilevered beam elements that extend along the wall spaced from the outer surface. A locking member extends about the coupler portion between the one or more cantilevered beam elements and the outer surface of the wall. The locking member is configured and disposed to limit deflection of the one or more cantilevered beam elements to prevent removal of the connector member from a substrate.

Also disclosed is a method of locking a connector member. The method includes inserting a coupler portion of the connector member through an opening, passing the coupler portion through the opening partially compressing one or more cantilevered beam elements that extend along an outer surface of the coupler portion, guiding cantilevered beam elements through the opening, releasing the cantilevered beam elements, positioning a locking member about the coupler portion, and guiding the locking member between the outer surface and the cantilevered beam elements.

Further disclosed is a system including a housing having an outer surface and an inner surface. The housing includes an opening that extends from the outer surface through the inner surface. A connector member is positioned in the opening of the housing. The connector member includes a coupler portion having a wall having a first end that extends to a second end that defines a connection zone. The wall includes an outer surface. A mounting portion is provided at the first end. The mounting portion includes one or more cantilevered beam elements that extend along the wall spaced from the outer surface. A locking member extends about the coupler portion between the one or more cantilevered beam elements and the outer surface of the wall. The locking member is configured and disposed to limit deflection of the one or more cantilevered beam elements to prevent removal of the connector member from a substrate.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
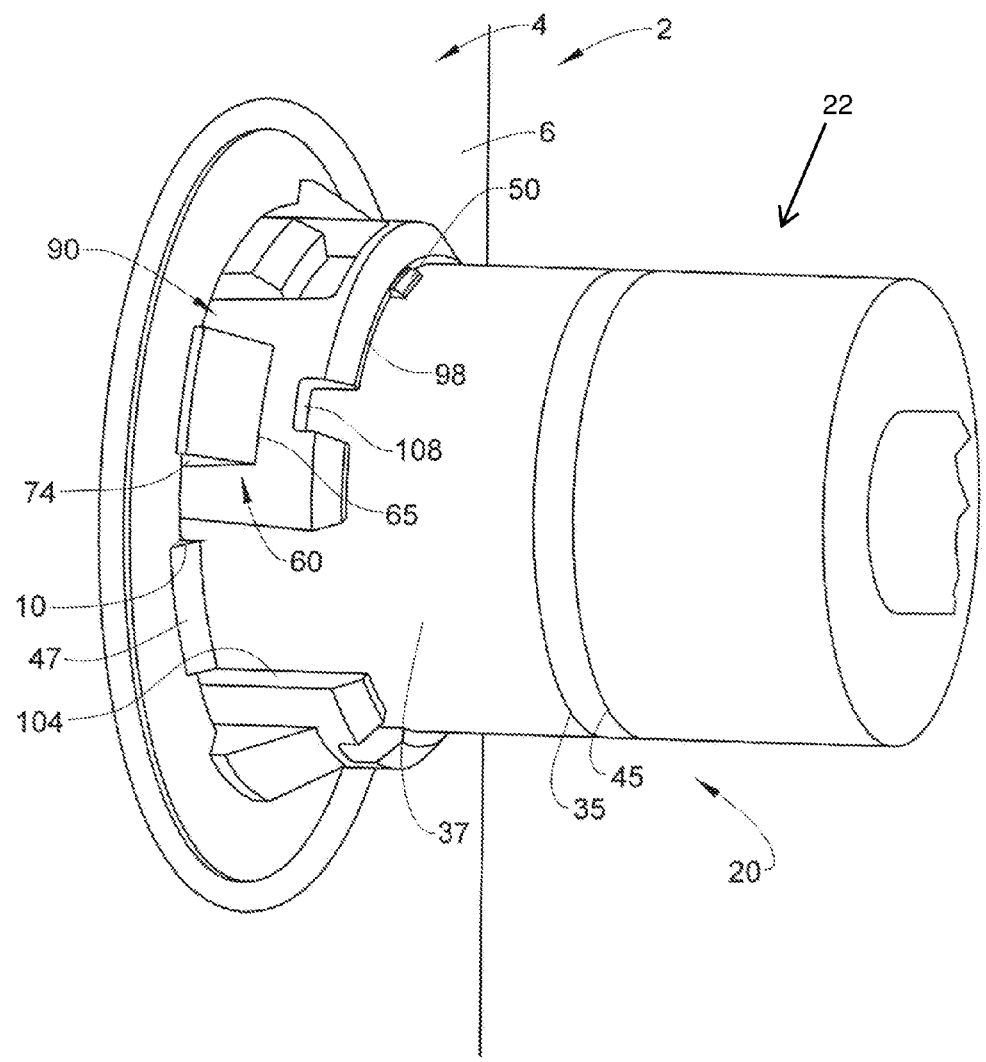
FIG. 1 depicts a system including a connector member having a locking member in accordance with an exemplary embodiment.

A system is illustrated generally at 2 in FIG. 1. System 2 takes the form of an automotive transmission. It should however be understood that system 2 can take on a variety of forms as will become more fully evident below. System 2 includes a housing 4 having an outer surface 6 and an inner surface 8. Housing 4 includes an opening 10 that extends through outer and inner surfaces 6 and 8. Opening 10 is provided with a connector member 20 that provides an interface point between components within housing 4 and external components through, for example, an external connector 22.

Figure 2:
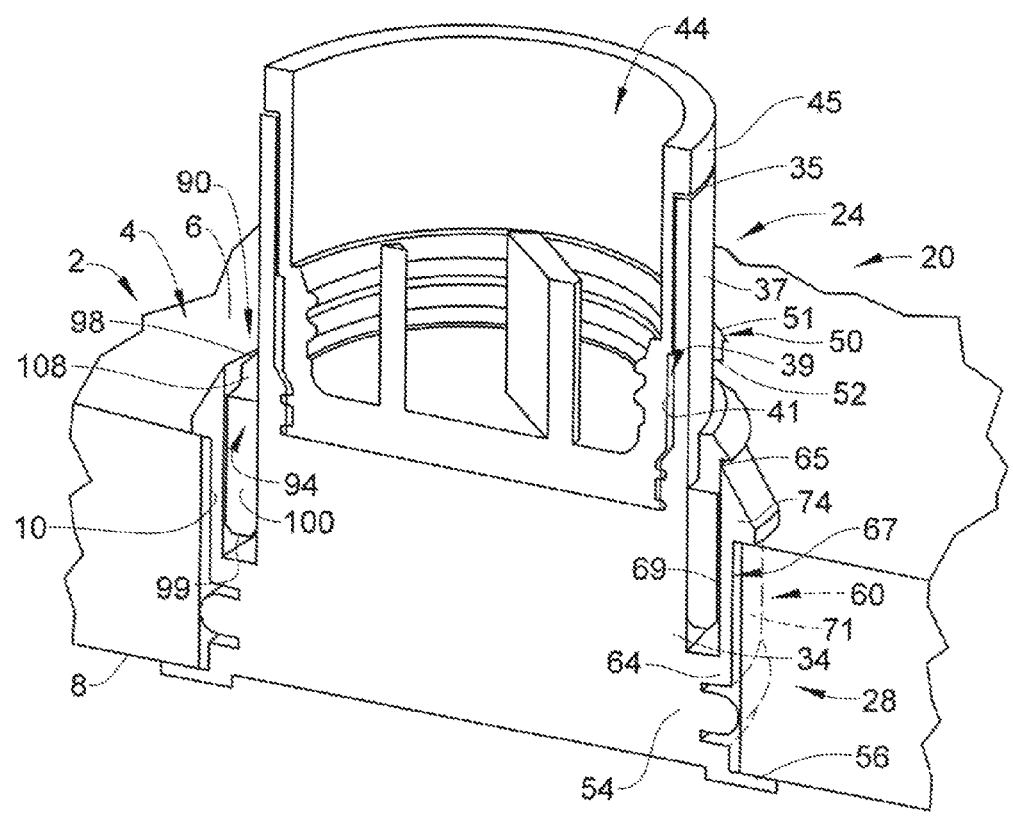
FIG. 2 depicts a cross-sectional side view of the connector member and locking member of FIG. 1.
Figure 3:
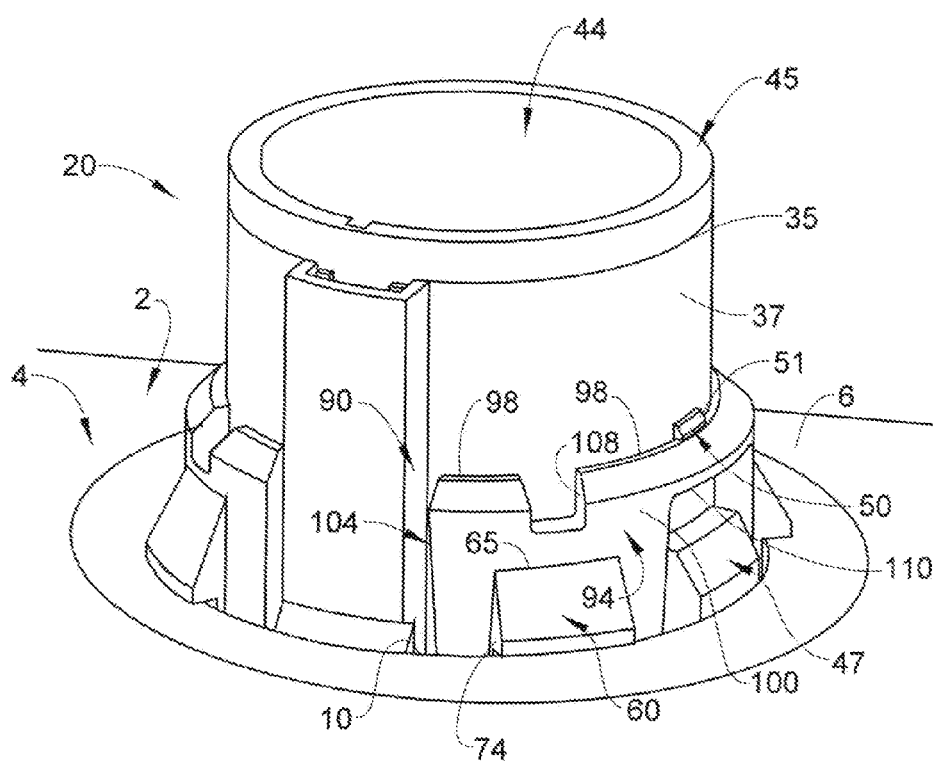
FIG. 3 depicts a perspective view of the connector member of FIG. 1.

As best shown in FIGS. 2-3, connector member 20 includes a coupler portion 24 that receives an external connector (not shown) and a mounting portion 28. Mounting portion 28 secures connector member 20 to housing 4 as will be detailed more fully below. Coupler portion 24 includes a first end 34 that extends to a second end 35 and includes an outer wall 37. In the exemplary embodiment shown, outer wall 37 includes a generally circular cross-section. Second end 35 includes a recessed portion 39 that includes an inner wall 41. Recessed portion 39 defines a connection zone 44 which, in the exemplary embodiment shown, receives a connection element 45. Coupler portion 24 is shown to include a plurality of projections, one of which is indicated at 47 and a plurality of locking member retaining features, one of which is indicated at 50. Projections 47 help locate the external connector relative to coupler portion 24. Each locking member retaining feature 50 includes a back angle section 51 and a retaining surface 52.

Mounting portion 28 includes a base section 54 having a flange 56 which, in the exemplary embodiment shown, abuts inner surface 8 of housing 4. Base section 54 also includes a plurality of cantilevered beam elements, one of which is indicated at 60, which secure connector member 20 to housing 4 through opening 10. Each cantilevered beam element 60 includes a first end section 64 that extends from base section 54 to a second end section 65 through an intermediate section 67. Intermediate section 67 includes an inner surface section 69 and an outer surface section 71. Inner surface section 69 is spaced from outer wall 37 so as to define a gap (not separately labeled) between coupler portion 24 and cantilevered beam elements 60. In addition, second end section 65 is provided with a hook portion 74 that engages with outer surface 6 when connector member 20 is installed through opening 10.

Figure 4:
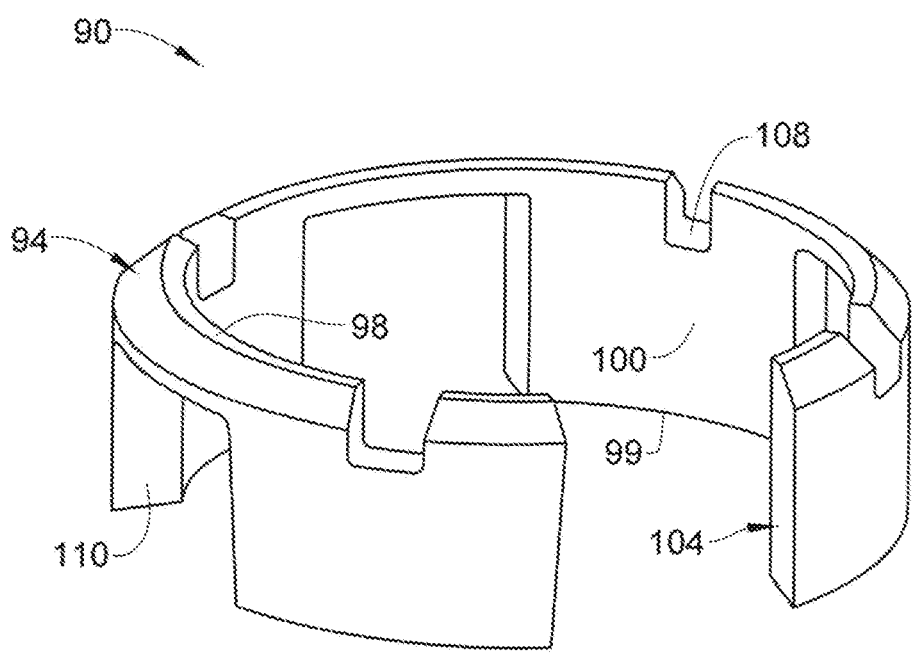
FIG. 4 depicts a perspective view of the locking member of FIG. 1.

In accordance with an exemplary embodiment, connector member 20 includes a locking member 90. As best shown in FIG. 4, locking member 90, as will be detailed more fully below, prevents inadvertent removal of connector member 20 from housing 4. Locking member 90 includes a body 94 including a first end portion 98 that extends to a second end portion 99 through an intermediate portion 100. Body 94 includes a generally circular cross-section that is slightly larger than coupler portion 24. Locking member 90 includes an interruption zone 104 that extends through intermediate portion 100 from first end portion 98 to second end portion 99. Interruption zone 104, in addition to accommodating projections extending radially outwardly from connector member 20, allows locking member 90 to be readily installed over coupler portion 24. Locking member 90 also includes a first plurality of recessed sections 108 formed in first end portion 98 and a second plurality of recessed portions 110 formed in second end portion 99. First plurality of recessed portions 108 are arranged so as to interact with corresponding structure (not shown) on an external connector, while second plurality of recessed portions 110 are arranged to accommodate one or more of projections 47.

Figure 5:
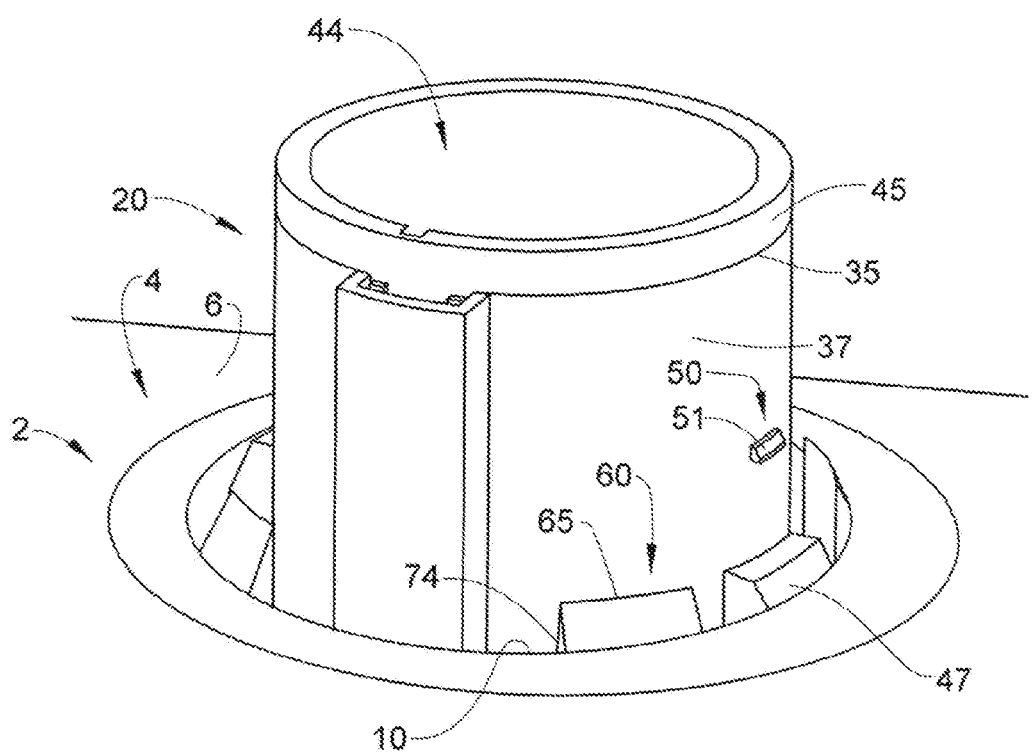
FIG. 5 is a perspective view of a coupler portion of the connector member of FIG. 3 passing through an opening in a housing of the system.
Figure 6:
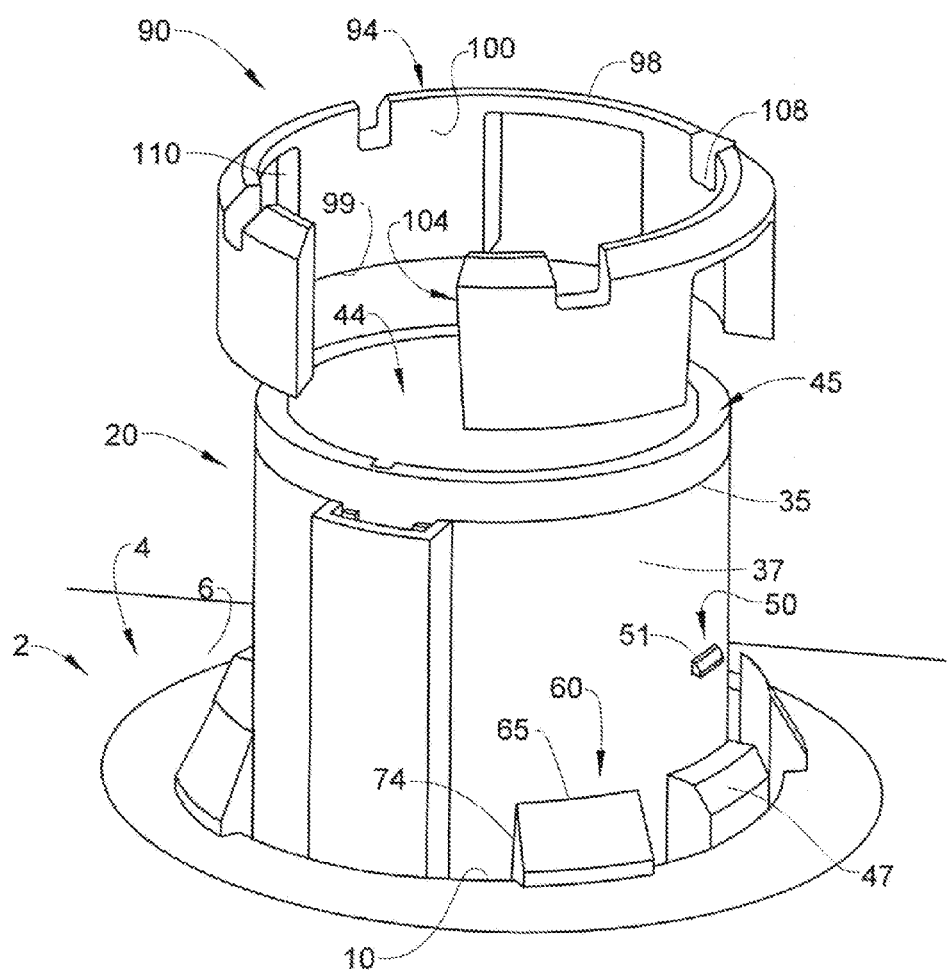
FIG. 6 is a perspective view of the locking member of FIG. 4 being guided onto the connector member of FIG. 3.
Figure 7:
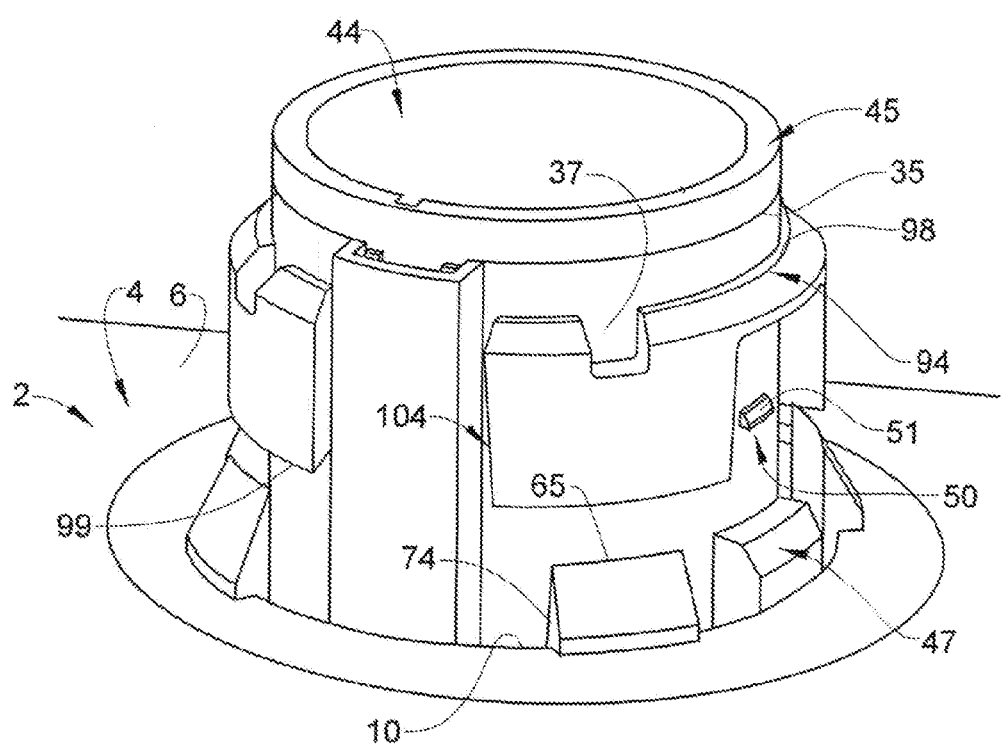
FIG. 7 is a perspective view of the locking member of FIG. 5 guided along an outer surface of a coupler portion of the connector member.

Reference will now be made to FIGS. 5-7 in describing a method for installing connector member 20 and locking member 90. As shown in FIG. 5, coupler portion 24 is inserted through opening 10. Connector member 20 is guided through opening 10 causing cantilevered beam elements 60 to deflect radially inwardly towards outer wall 37. As flange 56 nears inner surface 8, cantilevered beam elements 60 deflect radially outwardly allowing hook portions 74 to engage outer surface 6 as shown in FIG. 6. At this point, locking member 90 is positioned at second end 35 of coupler portion 24 and passed over outer wall 37 as shown in FIG. 7. Locking member 90 passes between outer wall 37 and inner surface section 69 of cantilevered beam elements 60. Second end portion 99 passes over back angle sections 51 of locking member retaining features 50. When fully seated, retaining surface 52 projects beyond first end portion 98 to secure locking member 90 to coupler portion 24. Once in place, locking member 90 prevents radial inward movement of cantilevered beam elements 60 effectively securing connector member 20 to housing 4. Connector member 20 may be removed by first removing locking member 90 and then radially inwardly deflecting cantilevered beam elements 60

At this point it should be understood that the exemplary embodiments describe a locking member for a connector. The locking member is disposed about a coupler portion of the connector member and positioned to prevent, or at least substantially limit, radial inward deflection of cantilevered beam elements. In this manner, the coupler portion is less prone to fall from a housing as a result of exposure to vibrations and the like. In addition, it should be understood that while described as being associated with a transmission for a motor vehicle, the locking member and connector member may be employed in a wide range of applications. Further, it should be understood that while described as being generally circular, the connector member and locking member may take on a variety of geometries.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A connector member comprising:
   a coupler portion including a wall having a first end that extends to a second end that defines a connection zone, the wall including an outer surface having a locking member retaining feature;
   a mounting portion provided at the first end, the mounting portion including one or more cantilevered beam elements that extend along the wall spaced from the outer surface; and
   a locking member extending about the coupler portion between the one or more cantilevered beam elements and the outer surface of the wall, the locking member including a first end portion, a second end portion and an intermediate portion extending therebetween, one of the first and second end portions being configured to be engaged by the locking member retaining feature, the intermediate portion including an interruption zone defining a space extending between the first end portion to the second end portion, the locking member being configured and disposed to limit deflection of the one or more cantilevered beam elements to prevent removal of the connector member from a substrate.

2. The connector member according to claim 1, wherein the locking member is configured and disposed to limit radial inward movement of the one or more cantilevered beam elements.

3. The connector member according to claim 1, wherein each of the one or more cantilevered beam elements includes a hook portion that projects radially outwardly from the connector member.

4. The connector member according to claim 1, wherein the outer surface of the wall includes at least one projection, the locking member including at least one recessed portion that is configured and disposed to receive the at least one projection.

5. The connector member according to claim 1, wherein the coupler portion includes a generally circular cross-section.

6. The connector member according to claim 1, wherein the second end includes a recessed portion, the connection zone being defined in the recessed portion.

7. A method of locking a connector member comprising:
   inserting a coupler portion of the connector member including an outer surface provided with a locking member retaining feature through an opening;
   passing the coupler portion through the opening partially compressing one or more cantilevered beam elements that extend along an outer surface of the coupler portion;
   guiding cantilevered beam elements through the opening;
   releasing the cantilevered beam elements;
   positioning a locking member having an interruption zone about the coupler portion, the interruption zone defining a space extending between a first end portion and a second end portion of the locking member;

guiding the locking member between the outer surface and the cantilevered beam elements; and retaining the locking member to the coupler portion through the locking member retaining feature.

8. The method of claim 7, wherein inserting a coupler portion of the connector member through the opening comprises mounting the connector member through a transmission housing.

9. The method of claim 7, wherein guiding the locking member between the outer surface and the cantilevered beam elements includes sliding the locking member towards a mounting portion that supports the cantilevered beam elements.

10. The method of claim 7, wherein guiding the locking member between the outer surface and the cantilevered beam elements includes aligning the interruption zone formed in the locking member with a projection provided on the outer surface.

11. A system comprising:

a housing including an outer surface and an inner surface, the housing including an opening that extends from the outer surface through the inner surface; and a connector member positioned in the opening of the housing, the connector member comprising:

a coupler portion including a wall having a first end that extends to a second end that defines a connection zone, the wall including an outer surface having a locking member retaining feature;

a mounting portion provided at the first end, the mounting portion including one or more cantilevered beam elements that extend along the wall spaced from the outer surface; and a locking member extending about the coupler portion between the one or more cantilevered beam elements and the outer surface of the wall, the locking member including a first end portion, a second end portion and an intermediate portion extending therebetween, one of the first and second end portions being configured to be engaged by the locking member retaining feature, the intermediate portion including an interruption zone defining a space extending between the first end portion to the second end portion, the locking member being configured and disposed to limit deflection of the one or more cantilevered beam elements to prevent removal of the connector member from a substrate.

12. The system according to claim 11, wherein the locking member is configured and disposed to limit radial inward movement of the one or more cantilevered beam elements.

13. The system according to claim 11, wherein each of the one or more cantilevered beam elements includes a hook portion that projects radially outwardly from the connector member.

14. The system according to claim 11, wherein the outer surface of the wall includes at least one projection, the locking member including at least one recessed portion that is configured and disposed to receive the at least one projection.

15. The system according to claim 11, wherein the housing defines a transmission housing.

* * * * *